United States Patent [19]

Peters

[11] 4,320,779
[45] Mar. 23, 1982

[54] PUSH-TYPE CONTROL VALVE FOR FLUID ACTUATOR

[75] Inventor: Clifford M. Peters, Longview, Tex.

[73] Assignee: W-K-M Wellhead Systems, Inc., Shreveport, La.

[21] Appl. No.: 176,366

[22] Filed: Aug. 8, 1980

[51] Int. Cl.³ ............................................... F15B 13/04
[52] U.S. Cl. .................................. 137/492.5; 137/458; 137/557; 137/625.66
[58] Field of Search ..................... 137/458, 492.5, 557, 137/625.66

[56] References Cited

U.S. PATENT DOCUMENTS

| 4,196,750 | 4/1980 | Peters | 137/625.66 |
| 4,239,058 | 12/1980 | Peters | 137/625.66 |
| 4,256,141 | 3/1981 | Peters | 137/625.66 |

*Primary Examiner*—Harold W. Weakley
*Attorney, Agent, or Firm*—Marvin J. Marnock; Eugene N. Riddle

[57] ABSTRACT

A pilot line-operated control valve (32) for an actuator (14) that operates a gate valve (12) in the main flowline (10). A slide valve (70) having a piston (76) on its inner end is mounted in a longitudinal bore (46) of the elongate valve body (40) for movement between an open position in which fluid is directed to actuator (14), and a closed position in which fluid is prevented from flowing to actuator (14). A fluid isolated pilot blocking portion (98) of slide valve (70) is oriented such that once slide valve (70) moves to the closed position, pilot blocking portion (98) abuts pilot port (56) so as to block pilot line fluid pressure from acting on slide valve (70) under any operating conditions, including even a resumption of fluid pressure in the pilot line (30), when slide valve (70) is in the closed position. The so-called push-type control valve (32) is reset by manually pushing slide valve (70) inwardly.

15 Claims, 5 Drawing Figures

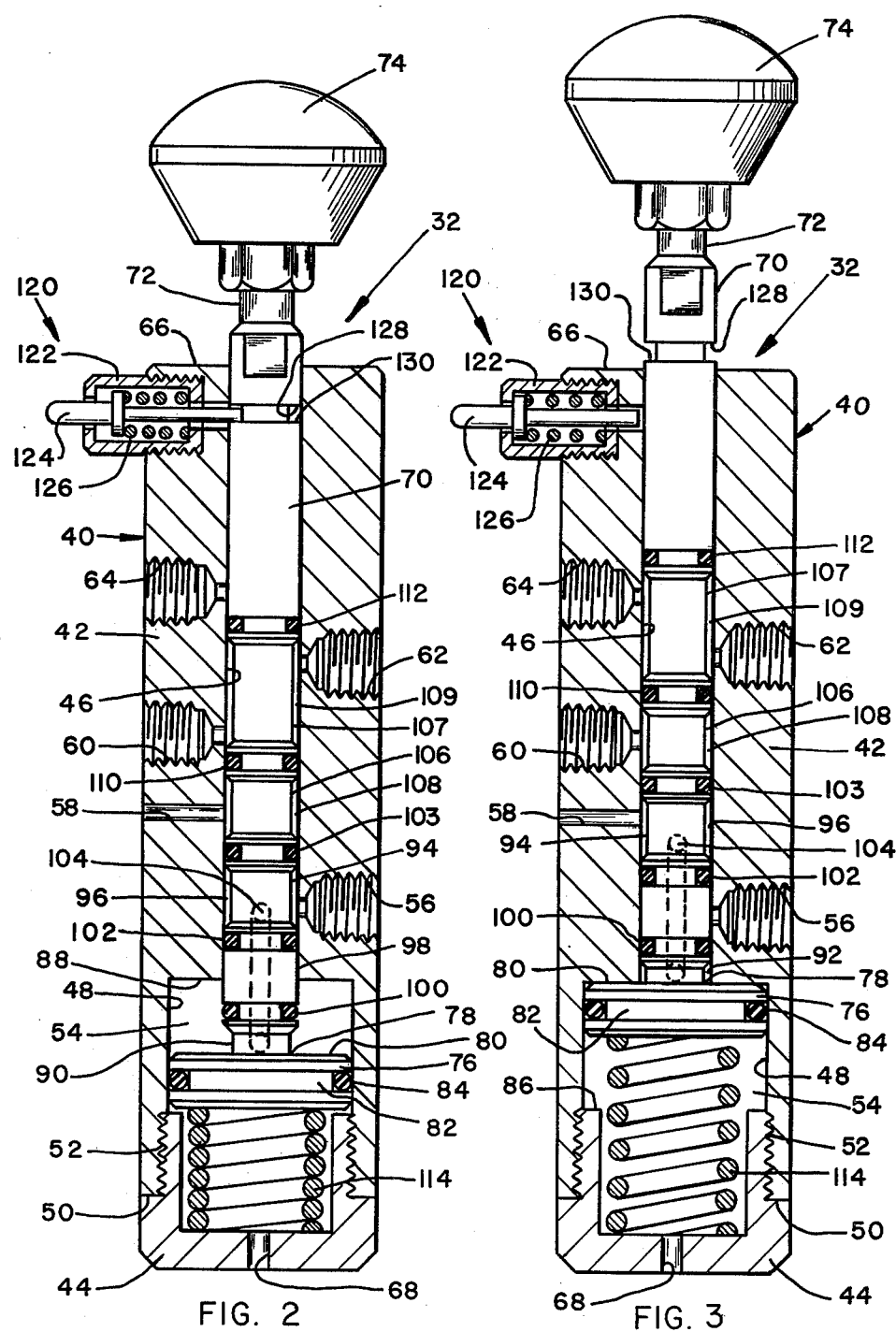

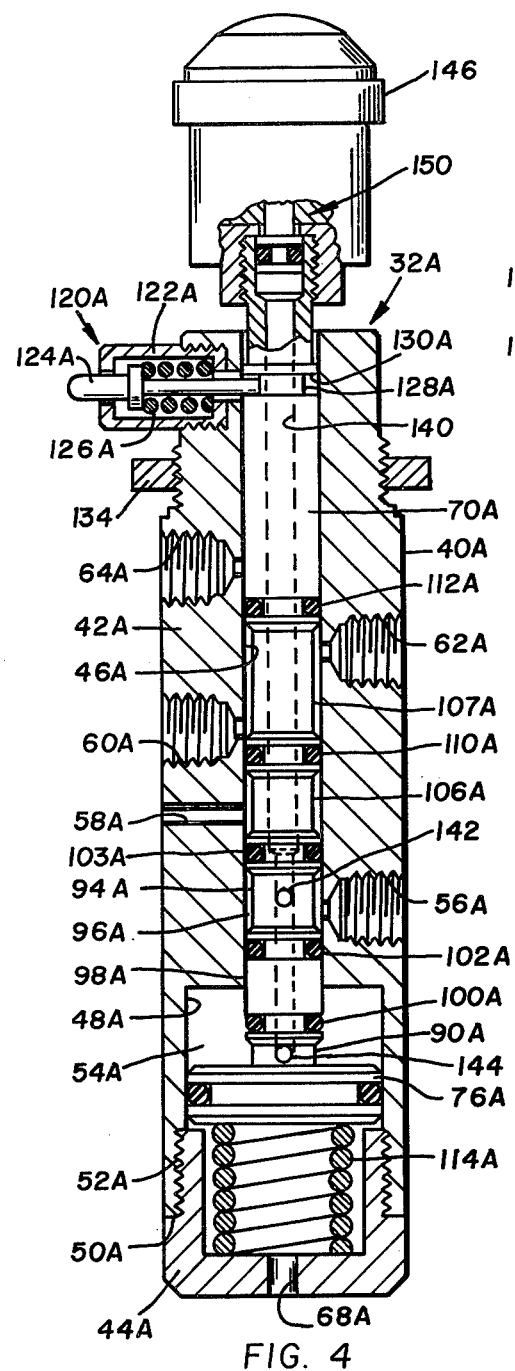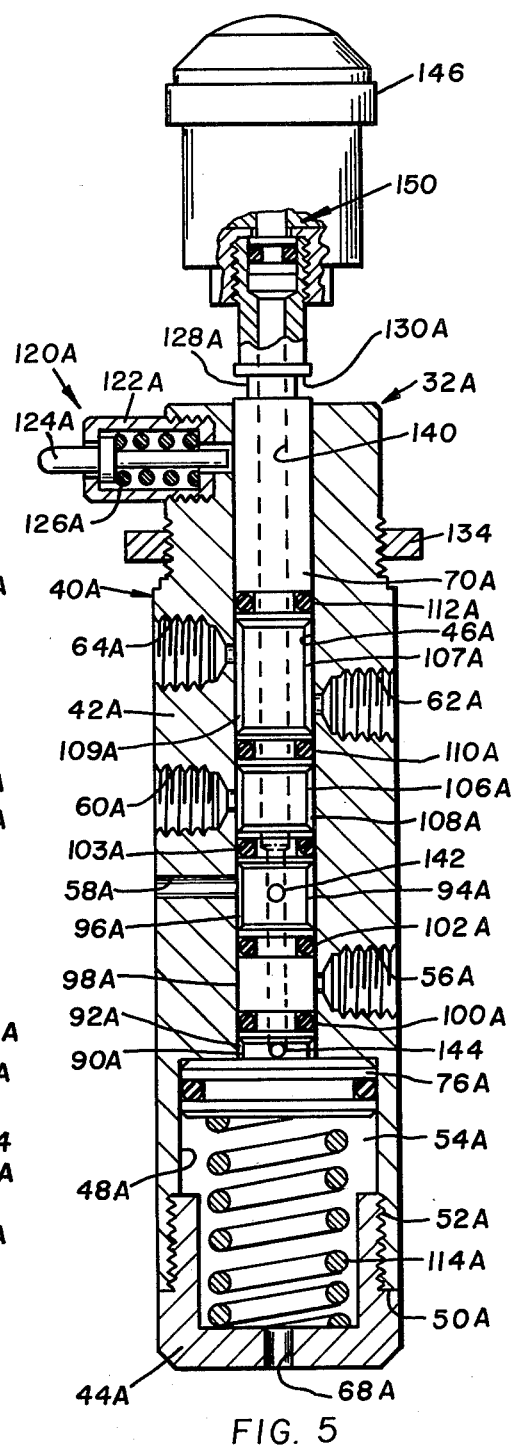

PUSH-TYPE CONTROL VALVE FOR FLUID ACTUATOR

BACKGROUND OF THE INVENTION

This invention relates generally to control valves, and more specifically, to a manually set control valve of the type used in a fluid control system such as a safety system for oil and gas wells.

The control valve of the invention is contemplated for use in safety systems which shut in well production lines or other flowlines in the event of unduly high or low pressure conditions in the main flowline. The general configuration of this type of safety system is generally shown in U.S. patent application Ser. No. 057,490 filed on July 13, 1979, now U.S. Pat. No. 4,256,146 by Peters. In the event of an abnormal pressure condition in the main flowline, the control valve moves from its unseated position to its seated position in which no fluid flows to the actuator. In response to the stoppage of fluid flow, the actuator closes the shut-off valve in the main flowline. A resumption of fluid flow to the actuator, which results in the opening of the shut-off valve, will occur upon the manual movement of the control valve to its unseated position.

For safety reasons, it is highly desirable that the control valve remains in the seated position until it is manually reset. A resumption of pilot pressure alone should not open the control valve.

Heretofore, arrangements used to achieve a so-called "lock out" of the control valve require an unduly complex valve structure, and rely on close tolerances and the integrity of O-ring seals to establish the necessary pressure conditions in the valve. These arrangements are exemplified by U.S. Pat. No. 4,145,025 issued to Bergeron on Mar. 20, 1979, U.S. Pat. No. 4,004,610 issued to Theriot on Jan. 25, 1977, U.S. Pat. No. 3,877,484 issued to Theriot et al on Apr. 15, 1975, and U.S. Pat. No. 4,094,340 issued to Bergeron on July 13, 1978. It is desirable that the control valve achieve a "lock out" when in the seated position without relying on close tolerances or the integrity of O-ring seals.

SUMMARY OF THE INVENTION

It is an object of the invention to provide an improved push-type control valve for a fluid actuator that achieves a highly effective lockout of the control valve once the control valve is in its seated position without relying on close tolerances or the integrity of O-ring seals, regardless of whether fluid pressure in the pilot line resumes.

The present invention is directed to a pilot line operated control valve for an actuator of the general type described above. The control valve includes a slide valve that moves between an unseated (or open) position in which fluid flows to the actuator, and a seated (or closed) position in which fluid does not flow to the actuator. When the slide valve is in the unseated position, pilot line fluid pressure passes through the pilot port and acts against a continuous opposing spring force to hold the slide valve in the unseated position. In the event an abnormal pressure condition in the main flowline occurs so that the pilot line fluid pressure cuts off, the slide valve will immediately move to the seated position under the force of the spring.

A fluid isolated pilot blocking portion of the slide valve is oriented such that once the slide valve has moved to the seated position, the pilot blocking portion abuts the pilot port so as to block pilot line fluid pressure from acting on the slide valve under any operating conditions, including even a resumption of fluid pressure in the pilot line, when the slide valve is in the seated position. The control valve may be reset by the manual inward movement of the slide valve from its seated to its unseated position.

BRIEF DESCRIPTION OF THE DRAWINGS

FIG. 2 is a sectional view of the control valve of FIG. 1 in the seated or closed position;

FIG. 3 is a sectional view of the control valve of FIG. 1 in the unseated or open position;

FIG. 4 is a sectional view of the control valve of FIG. 1 in the seated or closed position, but modified to include a visual indicator for indicating the condition of the control valve; and FIG. 5 is a sectional view of the control valve of FIG. 1 in the unseated or open position, but modified to include a visual indicator for indicating the condition of the control valve.

DETAILED DESCRIPTION OF A SPECIFIC EMBODIMENT

Figure 1:
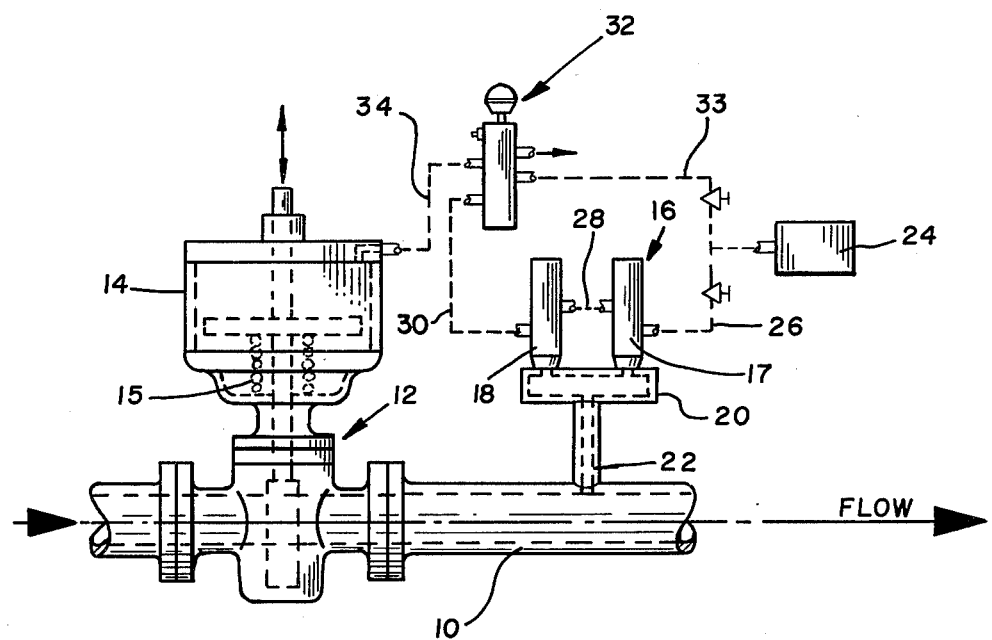
FIG. 1 is a diagrammatic view illustrating a fluid control safety system that includes a control valve constructed in accordance with the specific embodiment of the present invention, and being without visual indicator.

FIG. 1 illustrates a safety system for controlling fluid flow through a main flowline 10 which is typically the production line of an oil or gas well. A conventional gate valve 12 forms a surface safety valve which is opened and closed by a hydraulic or pneumatic actuator 14 in order to open and close main flowline 10. Actuator 14 maintains gate valve 12 in the open position when pressurized fluid is applied to the actuator, while bleeding of fluid from actuator 14 permits a spring 15 or the like to move gate valve 12 to the closed position.

The pressure in main flowline 10 is sensed by a high-low pilot valve assembly generally designated 16. A high pressure pilot 17 and a low pressure pilot 18 are mounted on a manifold 20 which receives fluid from a short conduit 22 connected with the main flowline 10. A fluid source 24, such as a pressurized cylinder of gas or hydraulic fluid, applies pilot fluid to high pressure pilot 17 through a conduit 26. A short conduit 28 extends between high pressure pilot 17 and low pressure pilot 18, while another conduit 30 extends from low pressure pilot 18 to connect with a control valve 32 which forms a specific embodiment of the present invention. A conduit 33 extends from fluid source 24 to control valve 32, and conduit 34 extends from control valve 32 to actuator 14.

High pressure pilot 17 is set to fire to the closed position if the pressure in main flowline 10 exceeds the predetermined high pressure level corresponding to the setting of the high pressure pilot 17. Conversely, low pressure pilot 18 is set to fire to the closed position when the pressure in main flowline 10 is below a predetermined low pressure level corresponding to the setting of low pressure pilot 18. Thus, an operating pressure range of the safety system is defined between the low pressure setting of low pressure pilot 18 and the high pressure setting of high pressure pilot 17. When the main flowline pressure is within the operating range, fluid is delivered from fluid source 24 through conduit 26, high pressure pilot 17, conduit 28, low pressure pilot 18, and conduit 30 to control valve 32 and so that control valve 32 is in an unseated (or open) position. When control valve 32 is in the open position, fluid passes from fluid source 24, through conduit 33, control valve 32 and conduit 34 to actuator 14 so that gate valve 12 is maintained in the open position. If the main flowline pressure drops below the setting of low pressure pilot 18, the flow from conduit 28 to conduit 30 is interrupted by low pressure pilot 18 and control valve 32 moves from the unseated (or open) position to the seated (or closed) position in order to bleed the fluid from actuator 14 so that gate valve 12 is closed. If the pressure in main flowline 10 rises above the setting of high pressure pilot 17, flow is interrupted by high pressure pilot 17 between conduits 26 and 28 to cause the control valve 32 to move from the unseated to seated position wherein fluid is bled from actuator 14 for closing gate valve 12. The movement of the control valve will be described in more detail hereinafter.

There are two embodiments of the control valve of the invention. One embodiment is a control valve without visual indicator and has a handle at the outer end of the slide valve. The other embodiment is a control valve with visual indicator and is of a generally similar construction and function as the control valve without visual indicator except for the presence of a visual indicator mechanism at the outer end of the slide valve. The visual indicator mechanism visually indicates the position of the control valve.

Referring specifically to FIGS. 2 and 3 in which the control valve without visual indicator is illustrated, control valve 32 has an elongate valve body 40 that is comprised of a main valve body 42 and an end cap 44. Main valve body 42 has a central longitudinal bore 46 therein which has an enlarged diameter bore portion 48 adjacent one end 50 of the main valve body. Enlarged diameter bore portion 48 has a set of threads 52 therein which receives a set of threads on end cap 44 so that end cap 44 is threadedly connected to main valve body 42. Enlarged diameter bore portion 48 together with end cap 44 define a piston chamber 54. Main valve body 42 has a pilot port 56 and a vent port 58 contained therein adjacent enlarged diameter bore portion 48, and an actuator fluid inlet port 60, an actuator fluid outlet port 62, and an actuator fluid vent port 64 contained therein. The pilot and vent ports, and the actuator fluid inlet, outlet and vent port all communicate with longitudinal bore 46. End cap 44 has an exhaust port 68 contained therein that communicates with piston chamber 54.

An elongate slide valve 70 is slidably received within longitudinal bore 46 for movement between seated or open position for directing fluid to actuator 14 and an unseated or closed position for bleeding fluid from actuator 14. When slide valve 70 is in its unseated position, piston 76 is unseated from outer shoulder 88 as illustrated in FIG. 2. When slide valve 70 is in its seated position, piston 76 is seated on outer shoulder 88 as illustrated in FIG. 3. Slide valve 70 has an outer end 72 which extends out of main valve body portion 42 and has a handle or knob 74 secured thereto to facilitate the manual movement of slide valve 70 within longitudinal bore 46 as will be described in more detail hereinafter.

A piston 76 is carried within piston chamber 54 on an inner end 78 of slide valve 70. Piston 76 has an outwardly facing pressure face 80 that receives pressurized fluid from pilot port 56 to hold slide valve 70 in its open position as will be described in more detail hereinafter.

Piston 76 further has a circumferential groove 82 therein that receives an O-ring 84 which provides for a fluid sealing relationship between piston 76 and enlarged diameter bore portion 48. The longitudinal travel of piston 76 within piston chamber 54 is limited by its abutment with an inner shoulder 86 of end cap 44 and an outer shoulder 88 enlarged diameter bore portion 48.

Slide valve 70 has a first reduced diameter portion 90 adjacent piston 76 which provides a first annular space 92 between slide valve 70 and longitudinal bore 48. Slide valve 70 has a second reduced diameter portion 94 that is spaced axially outwardly from first reduced diameter portion 90, and provides a second annular space 96 between slide valve 70 and longitudinal bore 48. A pilot blocking portion 98 is positioned mediate of first and second reduced diameter portions 90 and 94, and is of such a diameter that it abuts pilot port 56 so that an annular space does not exist between slide valve 70 and longitudinal bore 48. Pilot blocking portion 98 is fluidly isolated that the first and second reduced diameter portions of the slide valve by first and second O-rings 100 and 102 carried in their corresponding grooves adjacent first and second reduced diameter portions 90 and 94, respectively. A third O-ring 103 is carried in a groove in slide valve 70 at the axially outward end of second reduced diameter portion 94 and seals between second annular space 96 and the remainder of slide valve 70 that is axially outward of O-ring 103. Slide valve 70 has an internal passageway 104 therein which places first and second annular spaces 92 and 96 in constant fluid communication.

Slide valve 70 also has a third reduced diameter portion 106 and a fourth reduced diameter portion 107 spaced axially outward of the second reduced diameter portion and which provide a third annular space 108 and a fourth annular space 109, respectively, between slide valve 70 and longitudinal bore 46. A fourth and a fifth O-ring 110 and 112, respectively, are carried by their corresponding grooves contained in slide valve 70 at the opposite ends of fourth annular space 109. The fourth O-ring seals between the third and fourth annular spaces, and the fifth O-ring seals between the fourth annular space and the remainder of slide valve 70. As can be understood by a comparison of FIGS. 2 and 3, fourth annular space 109 is positioned on slide valve 70 such that it provides fluid communication between the actuator fluid inlet and outlet ports and thus allows fluid to pass to the actuator when the slide valve is in the unseated position, and between the actuator fluid outlet and vent ports and thus vents or bleeds fluid from the actuator when the slide valve is in the closed or seated position.

A spring 114 is positioned within piston chamber 54 so as to be compressively retained between end cap 44 and piston 76. Spring 114 continuously urges piston 76 into a position (closed position of slide valve 70) wherein it is seated on an outer shoulder 88 of enlarged diameter bore portion 48.

A detent mechanism generally designated 120 for temporarily holding slide valve 70 in the seated or open position includes a hollow sleeve fitting 122 which is threaded into the side of valve body 40 at a location near the outer end thereof. Sleeve 122 receives a sliding plunger 124 having an end projecting out of the sleeve. A compression spring 126 continuously urges plunger 124 outwardly. An annular groove 128 formed in slide valve 70 provides a shoulder 130 which under the influence of spring 114 frictionally contacts the inner end of plunger 124 when slide valve 70 is pushed inwardly to the open position and plunger 124 is pushed inwardly into contact with shoulder 130, as shown in FIG. 2. Slide valve 70 is thus held in the unseated or open position while the fluid pressure builds up in piston chamber 54. When the fluid pressure has built up sufficiently in chamber 54 to overcome the force of spring 114, the frictional engagement between plunger 124 and shoulder 130 is released, and spring 126 pushes plunger 124 outwardly to the released position. Although FIG. 3 illustrates the slide valve in the seated position, the plunger itself is illustrated in its released position.

FIG. 2 illustrates the slide valve in the unseated or open position. Slide valve 70 is at its innermost position with longitudinal bore 46 wherein piston 76 abuts inner shoulder 86 at end cap 44. Pressurized fluid from the pilot line passes through pilot port 56 into second annular space 96 wherein it passes through internal passageway 104 into piston chamber 54. Once within piston chamber 54, the force exerted by the pilot fluid acting on outwardly facing pressure face 80 of piston 76 is sufficient to overcome any opposing spring force and continuously maintains spring 114 in its compressed condition.

As described above, when a situation arises that creates an abnormal pressure condition in the main flowline, the flow of pressurized fluid to pilot port 56 of control valve 32 will cease. When the flow of fluid through pilot port 56 is stopped, the fluid no longer acts upon outwardly facing pressure face 80 of piston 76 with sufficient force to counteract the force exerted on piston 76 by spring 114. Consequently, spring 114 successfully seats piston 76 on outer shoulder 88, and, of course, slide valve 70 is moved into its seated position which is illustrated in FIG. 3.

As piston 76 moves outwardly from its innermost position, fluid is forced through internal passageway 104 and into second annular space 96. Once second annular space 96 is in communication with vent port 58, the fluid is then vented out vent port 58. Fluid communication between pilot port 56 and outwardly facing pressure face 80 of piston 76 is blocked by pilot blocking portion 98 of slide valve 70, first O-ring 100 and second O-ring 102. If fluid ever leaked by first O-ring 100, it would be vented out vent port 58 via internal passageway 104. If fluid leaked by second O-ring 102, it would be directly vented out vent port 58.

When slide valve 70 is in its seated position, fluid communication between actuator fluid inlet and outlet ports 60 and 62 is blocked by fourth O-ring 110. Fluid is then vented from the actuator as described above. The fluid at actuator fluid inlet port 60 acts against third reduced diameter portion 106 so as to maintain the slide valve in its seated position. The third reduced diameter portion has shoulders designed so that the actuator fluid always acts in opposite directions with equal force.

Once control valve 32 has moved to the seated position, it is important that it does not automatically move back into an unseated position in response to a resumption of adequate fluid pressure to pilot port 56. This is especially true if the fluid pressure to the pilot port 57 resumes prematurely (e.g. prior to the correction of the situation which caused the abnormal flowline pressure condition). Applicant's control valve is designed so that it will not move from the closed to the open position except by a manual pushing on handle 74 which drives slide valve 70 to the unseated position.

When slide valve 70 is in the seated position, pilot blocking portion 98 of slide valve 70 abuts pilot port 56 so as to function as a barrier that prevents fluid in pilot port 56 from entering longitudinal bore 46 and acting on outwardly facing pressure face 80 of piston 76. In the event fluid pressure is restored to pilot port 56, this fluid pressure acts against only a relatively small area and does so in a direction generally perpendicular to the longitudinal axis of the slide valve. Thus, pilot blocking portion 98 performs its function regardless of the magnitude of the fluid pressure at pilot port 56. Further, the first and second O-rings carried by the slide valve at either end of the pilot blocking portion 98 prevent fluid from the pilot port from passing into the first or second annular spaces. However, even if fluid leaked past the first or second O-rings, it would be vented out vent port 58 as described above.

Once it is desired that the main flowline be opened, fluid flow to the actuator may be resumed by pushing on the slide valve to its unseated position so that the detent mechanism functions to maintain the slide valve in its unseated position until fluid from the pilot port acts with sufficient force on the piston to maintain the slide valve in the unseated position and the detent mechanism moves to its released position as described above.

Referring specifically to FIGS. 4 and 5 in which the control valve with visual indicator is illustrated, it can be seen that the elongate valve body 40A of the control valve with visual indicator is similar to that of the control valve without visual indicator. The only difference is that the elongate body of the control valve without visual indicator is of a standard type, and the elongate body of the control valve with visual indicator is of the panel unit type. Further, the slide valve 70A of the control valve with visual indicator is also identical to that of the control valve without visual indicator except for the presence of the fluid passage and the visual indicator mechanisms and their associated structure. The reference numerals relating to the control valve with visual indicator are the same as their corresponding numerals of the control valve without visual indicator except that they include the letter "A".

The structure of most of the elongate body and external features of the slide valve of the control valve with visual indicator can be understood in light of the description of these aspects of the control valve without visual indicator. Thus, the description of these features of the control valve without visual indicator will suffice for that of the control valve with visual indicator. However, the dissimilar features of the control valve with visual indicator are described hereinafter.

A nut 134 is threaded onto valve body 40A to mount control valve relay 32A to a panel or the like (not shown). The panel is received between nut 134 and a shoulder 136 formed on body 40A.

Slide valve 70A is provided with a fluid passage 140 extending longitudinally therein. A first cross port 142 is formed in second reduced diameter portion 94A in order to provide an inlet to passage 140 which directs fluid from pilot port 56A into passage 140 when slide valve 70A is in the unseated position. First cross port 142 is located between the second and third O-rings. A second cross port 144 is formed in first reduced diameter portion 90A in order to provide an outlet for passage 140 which delivers fluid from passage 140 into annular chamber 92A and then to piston chamber 54A. Second cross port 144 is located between the first O-ring and piston 82A.

A knob 146 mounted on the outer end of slide valve 70A houses a visual indicator mechanism generally designated 150. The visual indicator mechanism can be of a type disclosed in U.S. Pat. No. 4,194,529 issued on Mar. 25, 1980 to Hargraves and Peters, and disclosed in U.S. Pat. No. 4,137,942 issued on Feb. 6, 1979 to Hargraves and Peters. The specifications of U.S. Pat. Nos. 4,194,529 and 4,137,942 are hereby incorporated by reference herein. When the control valve 32A is in its unseated or open position, fluid pressure from the pilot ports acts on the visual indicator mechanism so that it indicates the control valve is unseated. In this situation, the visual indicator will indicate the color green. When the control valve is in its seated position, the fluid pressure within the fluid passage is vented therefrom and the visual indicator mechanism indicates the control valve is seated. In this situation, the visual indicator will indicate the color red. Thus, when the visual indicator indicates green the fluid flows through the main flowline and when the visual indicator indicates red the fluid is not flowing through the main flowline.

In a manner similar to that described for the control valve without visual indicator, the detent mechanism 120A temporarily holds slide valve 70A in its seated or open position while the fluid pressure builds up in piston chamber 54A. When the fluid pressure has built up sufficiently in chamber 54A to overcome the force of spring 114A, the frictional engagement between plunger 124A and shoulder 130A is released, and spring 126A pushes plunger 124A outwardly to the released position. Although FIG. 5 illustrates the slide valve in the seated position, the plunger itself is illustrated in its released position.

FIG. 4 illustrates the slide valve in the unseated or open position. Slide valve 70A is at its innermost position within longitudinal bore 46A wherein piston 76A abuts inner shoulder 86A at end cap 44A. Pressurized fluid from the pilot line passes through pilot port 56A into second annular space 96A wherein it passes through first cross port 144 and into fluid passage 140. Fluid in the fluid passage passes into piston chamber 54A and upward through fluid passage 140 into contact with the visual indicator mechanism.

Once within piston chamber 54A, the force exerted by the pilot fluid acting on outwardly facing pressure face 80A of piston 76A is sufficient to overcome any opposing spring force and continuously maintain spring 114A in its compressed condition. The fluid pressure within the fluid passage acts on the visual indicator mechanism to place it in a condition so that it indicates the control valve is in its unseated or open position, and thus, fluid flows to the actuator, and the main flowline is open.

As described above, when a situation arises that creates an abnormal pressure condition in the main flowline, the flow of pressurized fluid to pilot port 56A of control valve 32A will cease. When the flow of fluid through pilot port 56A is stopped, the fluid no longer acts upon outwardly facing pressure face 80A of piston 76A with sufficient force to counteract the force exerted on piston 76A by spring 114A. Consequently, spring 114A successfully seats piston 76A on outer shoulder 88A, and, of course, slide valve 70A is moved into its seated position which is illustrated in FIG. 5.

As piston 76A moves outwardly from its innermost position, fluid from the piston chamber is forced through the portion of fluid passage 140 between the first and second cross ports and into second annular space 96. Further, fluid contained in fluid passage 140 between the visual indicator mechanism and the second cross port passes into the second annular space. Once second annular space 96A is in communication with vent port 58A, the fluid is then vented out vent port 58A. When fluid is vented from fluid passage 140, the absence of any fluid pressure acting on the visual indicator mechanism causes it to move to a position in which it indicates that the control valve is seated. Fluid communication between pilot port 56A and outwardly facing pressure face 80A of piston 76A is blocked by pilot blocking portion 98A of slide valve 70A, first O-ring 100A and second O-ring 102A. If fluid leaked by first O-ring 100A, it would be vented out vent port 58A via internal passage 104A. If fluid leaked by second O-ring 102A, it would be directly vented out vent port 58A.

When slide valve 70A is in its seated position, fluid communication between actuator fluid inlet and outlet ports 60A and 62A is blocked by fourth O-ring 110A. Fluid is then vented from the actuator as described above. The fluid at actuator fluid inlet port 60A acts against third reduced diameter portion 106A so as to maintain the slide valve in its seated position. The third reduced diameter portion has shoulders designed so that the actuator fluid always acts in opposite directions with equal force.

Once control valve 32A has moved to the seated position, it is important that it does not automatically move back into an unseated position in response to a resumption of adequate fluid pressure to pilot port 56A. This is especially true if the fluid pressure to the pilot port 56A resumes prematurely (e.g. prior to the correction of the situation which caused the abnormal flowline pressure condition). Applicant's control valve is designed so that it will not move from the closed to the open position except by a manual pushing on knob 146 which drives slide valve 70A to the unseated position.

When slide valve 70A is in the seated position, pilot blocking portion 98A of slide valve 70A abuts pilot port 56A so as to function as a barrier that prevents fluid in pilot port 56A from entering longitudinal bore 46A and acting on outwardly facing pressure face 80A of piston 76A. In the event fluid pressure is restored to pilot port 56A, this fluid pressure acts against only a relatively small area and does so in a direction generally perpendicular to the longitudinal axis of the slide valve. Thus, pilot blocking portion 98A performs its function regardless of the magnitude of the fluid pressure at pilot port 56A. Further, the first and second O-rings carried by the slide valve at either end of pilot blocking portion 98A prevent fluid from the pilot port from passing into the first or second annular spaces. However, even if fluid leaked past the first or second O-rings, it would be vented out vent port 58A as described above.

Once it is desired that the main flowline be opened, fluid flow to the actuator may be resumed by pushing on the slide valve to its unseated position so that the detent mechanism functions to maintain the slide valve in its unseated position until fluid from the pilot port acts with sufficient force on the piston to maintain the slide valve in the unseated position and the detent mechanism moves to its released position as described above.

What is claimed is:

1. A valve for controlling fluid flow to an actuator in response to pressure changes in a pilot line, said valve comprising:

a valve body having a longitudinal bore therein, said longitudinal bore having an enlarged diameter bore portion defining a piston chamber in said valve body;

a slide valve mounted in said longitudinal bore for longitudinal movement between an unseated position for directing fluid to the actuator and a seated position for bleeding fluid from the actuator, said slide valve having opposite inner and outer ends, said outer end extending outwardly of said valve body and adapted to be manually pushed so as to push said slide valve inwardly from the seated position to the unseated position for manually setting said slide valve;

biasing means, mounted in said piston chamber, for biasing said slide valve to the seated position;

a pilot port in said valve body for connection to the pilot line to sense fluid pressure therein;

a piston carried in said piston chamber on said inner end of said slide valve, said piston presenting an outwardly facing pressure face for receiving pressurized fluid from said pilot port to hold said slide valve in the unseated position;

a fluid directing means, in said slide valve, for directing fluid from said pilot port to said outwardly facing pressure face when said slide valve is in the unseated position and for venting fluid from said outwardly facing pressure face when said slide valve is in the seated position; and said slide valve having a pilot blocking portion positioned along the length of said slide valve so that said pilot blocking portion abuts said pilot port under all operating conditions when said slide valve is in the seated position so as to block fluid pressure from the pilot line from acting on said outwardly facing pressure face of said piston.

2. The valve of claim 1 wherein said fluid directing means comprises:

an internal passageway in said slide valve;

a vent port in said valve body;

a first communication means, in said slide valve, for providing communication between said internal passageway and said outwardly facing pressure face under all conditions of operation of said slide valve; and a second communication means, in said slide valve, for providing communication between said internal passage and said vent port to vent fluid from said internal passageway when said slide valve is in the seated position and for providing communication between said pilot port and said internal passageway to, in cooperation with said first communication means, direct fluid against said outwardly facing pressure face of said piston for holding said slide valve in the unseated position when said slide valve is in the unseated position.

3. The valve of claim 2 wherein said first communication means comprises a first reduced diameter portion of said slide valve positioned axially inward of said pilot blocking portion and providing a first annular space between said slide valve and said longitudinal bore, and said second communication means comprises a second reduced diameter portion of said slide valve positioned axially outward of said pilot blocking portion and providing a second annular space between said slide valve and said longitudinal bore.

4. The valve of claim 2 further includes:

first seal means, mounted to said slide valve, for sealing between said pilot blocking portion and said first and second communication means.

5. The valve of claim 4 wherein said first seal means comprises an annular groove in said slide valve at each end of said pilot blocking portion so that said annular grooves join said pilot blocking portion with said first and second communication means, and an O-ring of elastomeric material mounted within each of said annular grooves.

6. The valve of claim 1 wherein said elongate valve body includes an actuator fluid inlet port, an actuator fluid outlet port, and an actuator fluid vent port, a third communication means, in said slide valve, for providing communication between said actuator fluid outlet and vent ports to vent fluid from said actuator when said slide valve is in the seated position and for providing communication between said actuator fluid outlet and inlet ports to allow fluid to travel to the actuator when said slide valve is in the unseated position, and a second seal means, mounted to said slide valve, for sealing between said actuator fluid inlet and vent ports.

7. The valve of claim 6 wherein said third communication means comprises a third reduced diameter portion of said slide valve providing a third annular space between said slide valve and said longitudinal bore.

8. The valve of claim 1 wherein a knob is connected to said outer end of said slide valve for facilitating the manual movement of said slide valve from the seated position to the unseated position.

9. The valve of claim 1 wherein said biasing means comprises a spring compressively positioned between an inward end of said piston chamber and said piston.

10. The valve of claim 1 wherein said elongate valve body has an exhaust port in an inner end thereof.

11. The valve of claim 1 further comprising a releasable detent means, in said valve body, for temporarily holding said slide valve in its unseated position when manually set therein.

12. The valve of claim 1 further including a visual indicator mechanism at said outer end of said slide valve, and said fluid directing means further directs fluid from said pilot port to act against said visual indicator mechanism when said slide valve is in the unseated position so that said visual indicator mechanism indicates that said slide valve is in the unseated position, and vents fluid from said visual indicator mechanism when said slide valve is in the seated position so that said visual indicator indicates that said slide valve is in the seated position.

13. A system for controlling the flow of fluid through a main flowline in response to pressure changes of fluid therein outside of a predetermined pressure range comprising:

a shut-off valve connected to the main flowline for moving between an open and closed position to permit or prevent flow therethrough, respectively;

an actuator operatively connected to said shut-off valve for moving said shut-off valve to the open position or closed position;

a high-low pilot valve assembly connected to the main flowline for directly sensing fluid pressure in the main flowline and being in either an open position when the fluid within the main flowline is within the predetermined pressure range or in a closed position when fluid within the main flowline is outside of the predetermined pressure range;

a pressurized actuator fluid source connected to said high-low pilot assembly;

a control valve having an elongate body including a longitudinal bore therein, said longitudinal bore having an enlarged bore portion defining a piston chamber in said elongate valve body;

said valve body having an actuator fluid inlet port connected to said pressurized actuator fluid source, an actuator fluid outlet port connected to said actuator, and an actuator fluid vent port vented to atmosphere;

a slide valve mounted in said longitudinal bore for movement between an unseated position for directing fluid received through said actuator fluid inlet port to said actuator fluid outlet port for travel to said actuator and a seated position for bleeding fluid from said actuator through said actuator fluid vent port;

a biasing means, mounted in said piston chamber, for biasing said slide valve to the seated position;

said elongate valve body having a pilot port connected to said high-low pilot valve assembly by a pilot line to sense the fluid pressure in the pilot line;

a piston carried in said piston chamber on an inner end of said slide valve, said piston presenting an outwardly facing pressure face for receiving pressurized fluid from said pilot port to hold said slide valve in the unseated position;

a fluid directing means, in said slide valve, for directing fluid from said pilot port to said outwardly facing pressure face when said slide valve is in the unseated position and for venting fluid from said outwardly facing pressure face when said slide valve is in the seated position; and said slide valve having a pilot blocking portion positioned along the length of said slide valve so that said pilot blocking portion abuts said pilot port under all conditions of operation when said slide valve is in the seated position so as to block fluid pressure from the pilot line from acting on said outwardly facing pressure face of said piston.

14. The system of claim 13 wherein said fluid directing means comprises:

an internal passageway in said slide valve;

a vent port in said valve body;

a first communication means, in said slide valve, for providing communication between said internal passageway and said outwardly facing pressure face under all conditions of operation of said slide valve; and a second communication means, in said slide valve, for providing communication between said internal passageway and said vent port to vent fluid from said internal passageway when said slide valve is in the seated position and to provide communication between said pilot port and said internal passageway to, in cooperation with said first communication means, direct fluid against said outwardly facing pressure face of said piston for holding said slide valve in the unseated position when said slide valve is in the unseated position.

15. The valve of claim 13 further including a visual indicator mechanism at said outer end of said slide valve, and said fluid directing means further directs fluid from said pilot port to act against said visual indicator mechanism when said slide valve is in the unseated position so that said visual indicator mechanism indicates that said slide valve is in the unseated position, and vents fluid from said visual indicator mechanism when said slide valve is in the seated position so that said visual indicator indicates that said slide valve is in the seated position.

* * * * *

UNITED STATES PATENT AND TRADEMARK OFFICE
CERTIFICATE OF CORRECTION

PATENT NO. : 4,320,779
DATED : March 23, 1982
INVENTOR(S) : Clifford M. Peters

It is certified that error appears in the above—identified patent and that said Letters Patent are hereby corrected as shown below:

Column 2, line 16, cancel "seated" and substitute -- unseated --;
cancel "closed" and substitute -- open --.

Column 2, line 18, cancel "unseated" and substitute -- seated --;
cancel "open" and substitute -- closed --.

Signed and Sealed this

Thirteenth Day of September 1983

[SEAL]

Attest:

GERALD J. MOSSINGHOFF

Attesting Officer

Commissioner of Patents and Trademarks